July 11, 1939.　　　　　D. W. PERKINS　　　　　2,165,939
VEHICLE BODY CONSTRUCTION
Filed Oct. 29, 1936　　　　2 Sheets-Sheet 1

INVENTOR.
DOW W. PERKINS
BY
ATTORNEY.

July 11, 1939.    D. W. PERKINS    2,165,939
VEHICLE BODY CONSTRUCTION
Filed Oct. 29, 1936    2 Sheets-Sheet 2
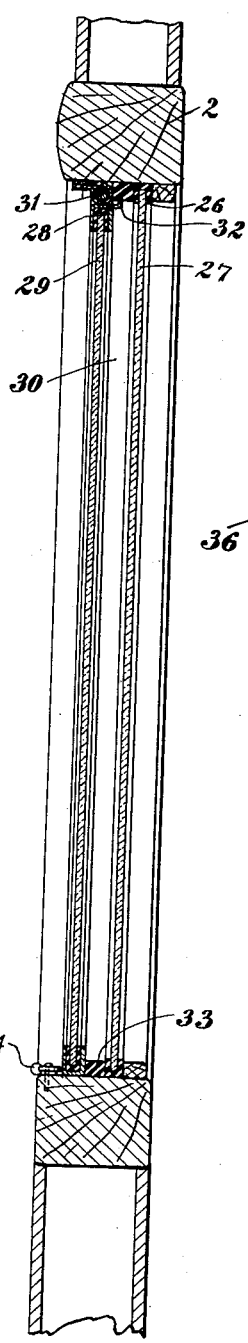
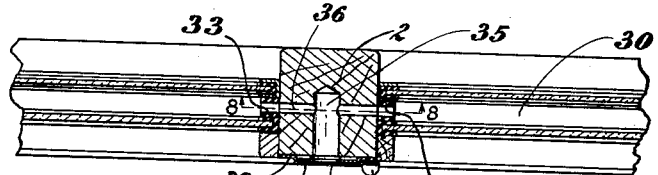
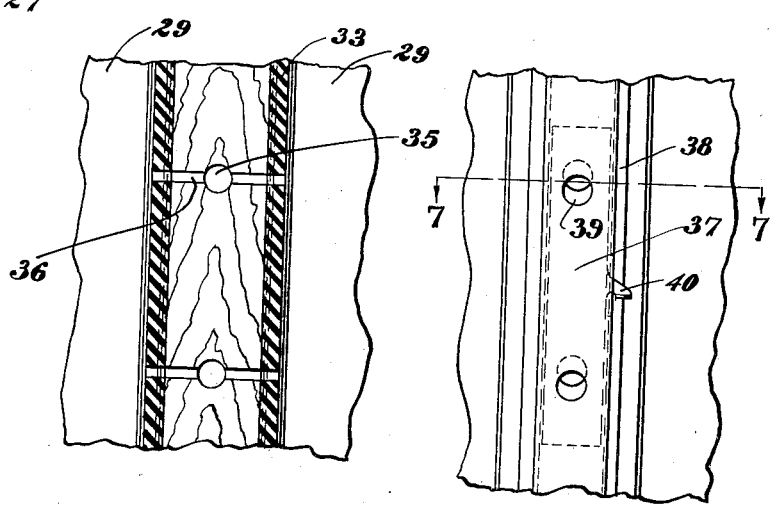
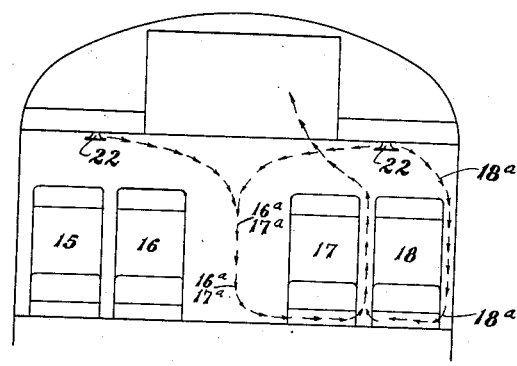
INVENTOR.
DOW W. PERKINS
BY
ATTORNEY.

Patented July 11, 1939

2,165,939

UNITED STATES PATENT OFFICE 2,165,939

VEHICLE BODY CONSTRUCTION

Dow W. Perkins, Cleveland, Ohio, assignor to The White Motor Company, Cleveland, Ohio Application October 29, 1936, Serial No. 108,260

4 Claims. (Cl. 98—10)

My invention pertains to a vehicle body construction and more particularly to ventilation or air conditioning thereof.

I am not unaware that the specified purpose of my invention has been in the minds of vehicle manufacturers during a rather rapid progressive development of several years, but by the incorporation of the features of my invention, I believe I have originated a comprehensive passenger compartment improvement which is to be distinguished advantageously from earlier makeshift provisions that had contrastingly crude adaptations to available space in vehicle bodies which had not been initially designed with consideration of ventilation or air-conditioning needs.

Objects of my invention are:

(1) Realization of an improved air conditioning by utilization of concealed available space in the wall or walls of the vehicle body, as exemplified, utilizing hollow lateral luggage shelves as the conduits having valve controlled outlets.

(2) Location of outlets at individual seats with avoidance of disagreeable, not to say harmful, exposure to draft.

(3) Provision of manually or automatically operable valves within convenient reach of any passenger, together with an associated deflector for avoiding direct air current impingement.

(4) Provision of valve controlled means for preventing condensation on double windows having spaced panes of glass whereby to effect atmospheric communication to the pane-intervening space.

(5) Arrangement for bodily displacement (as exemplified, with a hinged connection) of the frame of one window pane to permit cleaning access to the normally juxtaposed interior sides of the panes of glass, together with means for reestablishing therebetween a seal to prevent circulation therebetween and for maintaining such an interfitting.

(6) Relative location of certain parts for performance of a method of achieving prescribed circulation of air currents, whereby chilled air currents are laterally discharged above seated passengers to sink gravitationally on both sides of a chair or group of chairs on one side after impingement against a lateral wall of the vehicle and on the other side after impingement over a middle aisle with a counter air current coming from the opposite side of the vehicle, following which the two downward flows will circuitously rise between a pair of adjacent chairs and as a single current thereafter drift through the comparatively colder, laterally discharged air currents over the middle aisle to them move rearardly between the upper confines of the vehicle preparatory to being rechilled and redistributed as a continuous cycle of conditioned (filtered and temperature-controlled) air with realization of a "feathered" circulation.

Adverting to the drawings:

Figure 5 is a vertical section through the seating compartment and supplied with indicating arrows illustrative of the gentle circuitous flow of air around a passenger.

Figure 6 is an enlarged vertical cross-section through a window frame.

Figure 7 is a horizontal section through adjoining window frames.

Figure 8 is a section taken on line 8—8 of Figure 7.

Figure 9 is a broken elevation of the middle portion of Figure 7.

Figure 1:
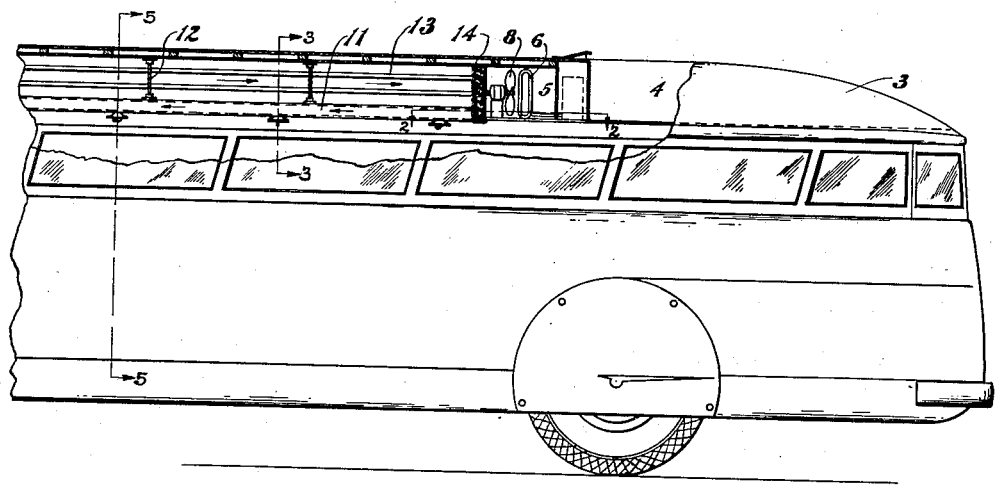
Figure 1 is a part side elevation of a vehicle body construction embodying the principles of my invention, an upper portion of the roof structure being cut away to reveal the interior arrangement.
Figure 3:
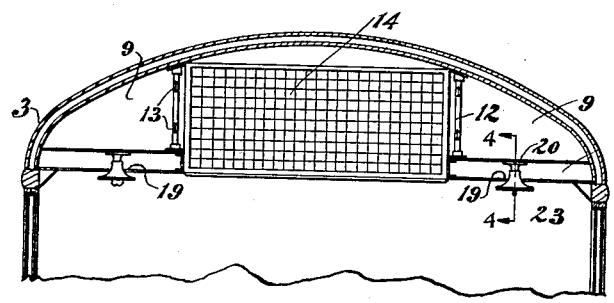
Figure 3 is an enlarged vertical section on line 3—3 of Figure 1 looking rearwardly.

The wheel-carried body 1 comprises a row of composite window frames 2 surmounted by a hollow roof 3 of which the rearmost interior space 4 is for occupancy by trunks or other heavy baggage insertible from the rear or top through a covered opening which latter is not illustrated because common practice and not to be claimed. In a partiitoned section 5, forwardly of the trunk space 4, are a series of air conditioning units arranged for cooperative exercise of function. As exemplified, one of the units 6 is any approved type of refrigerator of which only the coil has been numbered because not by itself claimed and because the details of its structure are of no consequence to my invention. Rearwardly of the coil 6 is mounted a duplex arcuate deflecting baffle 7, the shape of which is clearly revealed in Figure 2 and its function by the oppositely directed arrows forwardly thereof. In forward opposition to the coil 6 is mounted an electrically driven fan 8 designed to force air rearwardly through the coil 6 and against the duplex baffle 7. Air currents deflected by opposite lateral sides of the baffle 7, because of a roof-conforming partition 9 (shown in Figure 3) and because of a fan-encircling baffle 10, are compelled to move forwardly through two hollow hand baggage shelves 11 which are open at the rear just below the partition 9, which extend longitudinally of the vehicle along opposite sides thereof, which have their spacedly opposed margins supported by roof-depending brackets 12 with which latter longitudinally extending flexible straps 13 are connected and which have an air tight fit with the sides of the vehicle, with the partition 9 and with the baffle 10.

Figure 2:
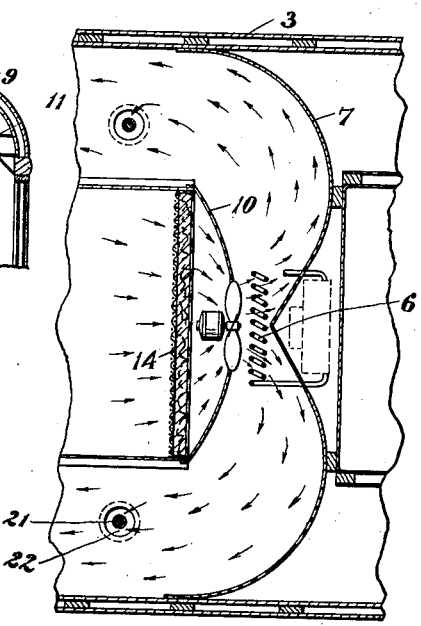
Figure 2 is an enlarged horizontal section on line 2—2 of Figure 1.

Between the hollow, air current-conducting shelves 11 and between their brackets 12 an aisle having elevated head room is provided for standing or walking passengers and the rear end of such head room space is defined by a partitioning air filter 14 which is located ahead of the fan 8 which is of such composition as to permit air to be drawn therethrough as suggested by the arrows ahead of it and behind it as drawn in Figure 2. Under each of the hollow shelves 11, as exemplified in Figure 5, are adjacent pairs of chairs arranged in rows extending from front to rear and also, except for aisle space along the longitudinal middle of the vehicle, arranged as laterally extending rows of four each. In Figure 5 I have numbered the four chairs of one laterally extending row as 15, 16, 17 and 18, counting from left to right.

Figure 4:
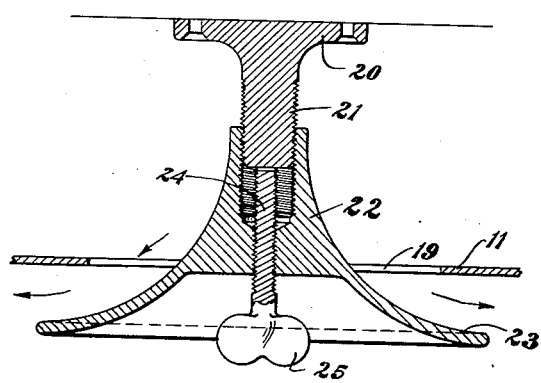
Figure 4 is a still further enlarged vertical sectional view through one of the valves as viewed on 4—4 of Figure 3.

The lower walls of the induced air-conduits 11 are provided with predeterminedly spaced outlet ports 19 which are located one over each pair of adjacent chairs. Suitably secured to and depending from the inner side of the upper wall of each conduit 11 and in axial alinement with one of the ports 19 is a bracket 20 having an exteriorly threaded lower end 21 on which is screwed an approximately bell shaped valve 22 which is projected through the port 19 and has a circumferentially flared lower margin 23 of larger diameter than the diameter of the port 19 which terminates to assume a substantially parallel relation to the lower wall of the conduit 11—all as clearly appears in Figure 4. The valve 22 is adapted to exercise its function upon being turned, to cause the margin 23 to approach toward or recede from the bottom wall of the conduit 11 around its port 19. At will be readily understood the annular extremity 23 is alternately adapted either to effect a closure of its port 19 or to serve as a deflector to cause escaping conditioned air initially to move only laterally. A set screw 24 is in screw threaded connection interiorly and centrally of the valve so that when its winged extremity 25 is turned to cause its upper end to engage the lower extremity of the bracket 20 a binding action is effected in the threaded connection of the valve 22 with the bracket 20 whereby to maintain any selected measure of opening of the valve or to maintain it in its closed position. Manual control for adjustment of any valve 22 is readily accomplished by a passenger seated therebelow, but any measure of air current discharge must be in lateral directions so that downward travel of any chilled air in consequence of gravitational action can occur only laterally beyond the two outer or more remote sides of an adjacent pair of chairs. Inviting attention to Figure 5 wherein is revealed an attempt to illustrate the realized duplex circuitous air current travel around each chair, and considering first the circulation enveloping the chair 18; air issuing from the open, superposed valve 22 in a direction toward the right wall of the vehicle (as viewed in Figure 5) will travel downwardly along the windowed wall after impinging against it at or above the top of the nearest window. The arrows marked 18a are intended to indicate that route half way around and along the outer side of the chair 18. Air issuing in opposed directions from the two open valves 22 appearing in Figure 5, which is to say, air flowing from each of said valves toward the longitudinal middle line of the vehicle will cause a meeting in the aisle of the opposed streams and if the discharge air currents have been chilled they will sink gravitationally as indicated by the aisle arrows 16a—17a. After reaching the floor the downward combined aisle currents unnecessarily become divided and a major part thereof become diverted laterally across the chairs 16 and 17. That current which moves forwardly across the chair 17 meets the current indicated by the arrows 18a and the combined current at that point rises upwardly between the chairs 17 and 18 and since progressively warmed will drift through the chilled counter streams which meet in the aisle to thereafter move rearwardly along the head room between and above the conduit shelves 11 to be evenutally drawn through the filter 14 preparatory to recooling in and redelivering from the chamber 5. The complete cycle including duplex and adjacent circuitous travel about each pair of chairs which are under an open valve has now been adequately traced, yet it may be appropriate to add that the described chair encircling air currents have been satisfactorily demonstrated in a commercially completed vehicle which has for some weeks been on public display and contemporaneously established the agreeable gentleness of the induced circulation.

Examination of Figure 6 will disclose the window frame 2 having fitted therein one sash 26 occupied by a pane of glass 27 having also mounted therein another sash 28 in spaced relation with respect to the sash 26 and occupied by a pane of glass 29. An air space 30 intervenes between the double window panes which structure so far as described has been earlier employed to present, however, a difficulty when necessary to wash the appositioned sides of the panes 27 and 29. In order to facilitate such cleaning of the opposed sides of the glass panes, I provide means permitting displacement of one of the windows in reference to the other. As exemplified, the outer window sash 28 is hinged at its upper edge to a hinge pin 31 suitably carried by the frame 2 and a compressible lip 32 is provided along the hinged connection to provide a seal in avoidance of air circulation there and the outer window is restored against a gasket 33 which surrounds the space 30. A lock 34 serves to secure the lower margin of the outer window and tightly to hold it against the gasket. It is evident that release of the lock 34 will permit the outer window to be swung upwardly and outwardly thereby conveniently affording cleaning access to the normally appositioned sides of the window panes.

Figures 7, 8 and 9 disclose structural features pertaining to an auxiliary ventilation contrivance which is purposed to preclude beclouding condensation on panes of double windows and which contrivance is subject for its operation to valve control. The upright frame members 2 between adjoining double windows are supplied with one or a row of horizontally extending bores 35 and with a pair of relatively transverse passages 36 in communication with each bore 35 and each passage 36 continues through one of the gaskets 33 on the near sides of adjoining windows respectively and which gaskets, as explained when describing Figure 6, are interposed between to space apart the double windows. A slide valve 37 is vertically movable in a slideway 38 which is attached along the frame 2 to the valve 37 provided with one or more apertures 39 when the valve is slid up or down through the agency of the handle 40. As will be readily apparent ventilation of the space 30 between the double windows may occur when the apertures 39 are caused to register with the bores 35.

I claim:

1. In a vehicle, the combination of a passenger compartment, a chamber above the rear of said compartment and extending from side to side of the latter, conduits provided with outlet ports and extending along the upper sides of said compartment and in communication with opposite sides of said chamber, a filter in a wall of said chamber between said conduits, blower mechanism in said chamber and interiorly adjacent to said filter, a duplex deflector of 3-shaped cross section mounted in said chamber on the opposite side of said blower mechanism with reference to the location of said filter and adapted to intercept air currents from said fan and to divert them to both of said conduits and deflectors juxtaposed to said ports respectively for compelling lateral discharge of air therethrough.

2. The method of air-conditioning the seating compartment of a vehicle which consists in forcing temperature-controlled air through a pair of hollow conduits in air-spaced relation below the top of the vehicle and each extending longitudinally and midway over seats arranged as a row on one side of the vehicle then causing simultaneous lateral discharge of air from each air-insulated overhead conduit to effect duplex circuitous air current travel from points adjacent to a median vertical plane of each lateral row of seats by deflecting said discharged air currents laterally and thereby compelling gravitational downward flow laterally and on both sides of both of said rows of seats whereby gently to effect the interrelated circulation.

3. The method of air-conditioning a passenger vehicle compartment with restricted free space about its seats arranged in rows along opposite sides of a middle aisle and adjacent to the side walls of the compartment, comprising the drawing of the air toward one end of the compartment, there filtering it, causing it to become subjected to a temperature-changing medium, delivering it along two branches extending toward the opposite end of the compartment above and laterally midway of said rows of seats respectively and both air-spaced insulated from the top of the vehicle and discharging it at predeterminedly spaced points from said branches while causing deflections thereof both toward the aisle and toward the proximate side wall whereby to effect impingement of two opposedly directed currents in the aisle and impingement of two oppositely directed currents each against one side wall of the compartment and so as to achieve independent gentle swirls of air about any seat.

4. In a vehicle, the combination of a passenger compartment, a chamber above one end of said compartment and extending from side to side of the latter, conduits provided with outlet ports and extending along the sides of said compartment, spaced from its roof and in communication with opposite sides of said chamber, a filter in a wall of said chamber between said conduits, blower mechanism including a fan in said chamber and adjacent to said filter, a temperature-controlling unit mounted in said chamber on the opposite side of said blower mechanism with reference to the location of said filter and adapted to intercept air currents from said fan and deflectors juxtaposed to said ports respectively compelling lateral discharge of air therethrough.

DOW W. PERKINS.